United States Patent
Broomhall et al.

(10) Patent No.: US 9,832,787 B2
(45) Date of Patent: Nov. 28, 2017

(54) ATTENTION MANAGEMENT

(71) Applicant: International Business Machines Corporation, Armonk, NY (US)

(72) Inventors: Matthew E. Broomhall, Goffstown, NH (US); Itzhack Goldberg, Hadera (IL); Bruce Kahn, Hudson, MA (US); Boaz Mizrachi, Haifa (IL); Neil Sondhi, Budapest (HU)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 14/815,046

(22) Filed: Jul. 31, 2015

(65) Prior Publication Data

US 2017/0034726 A1  Feb. 2, 2017

(51) Int. Cl.
*H04W 72/12* (2009.01)
*H04W 4/00* (2009.01)
*H04M 3/42* (2006.01)
*G06Q 30/00* (2012.01)

(52) U.S. Cl.
CPC ........ *H04W 72/1247* (2013.01); *G06Q 30/00* (2013.01); *H04M 3/42374* (2013.01); *H04W 4/00* (2013.01)

(58) Field of Classification Search
CPC combination set(s) only.
See application file for complete search history.

(56) References Cited

U.S. PATENT DOCUMENTS

| | | | |
|---|---|---|---|
| 8,312,089 B2 | 11/2012 | Deluca et al. | |
| 8,392,516 B2 | 3/2013 | Deluca et al. | |
| 2009/0037532 A1 | 2/2009 | Estrada | |
| 2010/0250682 A1 | 9/2010 | Goldberg et al. | |
| 2015/0056960 A1* | 2/2015 | Egner | H04W 12/08 455/411 |
| 2015/0223203 A1* | 8/2015 | Lindner | H04W 72/02 455/452.1 |

OTHER PUBLICATIONS

Kyle Turco, http://technologyadvice.com/5-ways-to-increase-your-productivity-using-technology/#.Un-LLndyBwg, Jun. 20, 2013.
http://www.regainyourtime.com/5-ways-to-improve-your-productivity-with-attention-management-2/, No Date, Printed on Jun. 30, 2015.
Graham Allcott, http://productivemuslim.com/manage-your-attention-and-get-things-done/ Mar. 8, 2015.

(Continued)

*Primary Examiner* — Yee Lam
(74) *Attorney, Agent, or Firm* — David S. Richart

(57) ABSTRACT

Techniques are described for attention management. In one embodiment, a computer program product comprising a computer-readable storage medium has program code embodied therewith. The program code is executable by a computing device to build a communication history between two or more users, perform an analysis of the communication history for a pattern of communication between the two or more users, and generate an assessment based on the analysis. The communication history may include data from multiple different communication systems.

18 Claims, 3 Drawing Sheets

(56) References Cited

OTHER PUBLICATIONS

J-P De Clerck, http://www.socialemailmarketing.eu/2010/10/whitelisting-versus-reputation-management-in-email-marketing-tips-to-get-started/, Oct. 27, 2010.
Cunningham, Paul, "The Case of the 24,368 Read Receipts", exchangeserverpro.com, Aug. 26, 2011, 24 pages, http://exchangeserverpro.com/real-world-case-read-receipts/>.
Malik, Sahli, "Outlook 2010—Disable the read receipt annoyance", Winsmarts.com, posted Jul. 8, 2010, 3 pages, <http://blah.winsmarts.com/2010-7-Outlook_2010_-and-ndash;_Disable_the_read_receipt_annoyance.aspx>.
"Email Read Receipts. Does the misuse of minimum effort technology undermine trust between colleagues?", WHATSTHEPOINT, Jan. 13, 2013, 12 pages, <hffp://whatsthepont.com/2013/01/13/email-read-receipts-does-the-misuse-of-minimum-effort-technology-undermine-trust-between-colleagues/>.
"Should You Have an Attention Management Strategy", Workforce Magazine, Site Staff, Apr. 25, 2012, 10 pages, <http://www.workforce.com/blogs/1-the-ethical-workplace/post/should-you-have-an-attention-management-strategy>.

* cited by examiner

ATTENTION MANAGEMENT

TECHNICAL FIELD

The invention relates to information management and data analytics systems.

BACKGROUND

The ever growing use of social tools as an additional means of communication is goodness on one hand but can become a problem on the other when people are overwhelmed by the large amount of incoming communications to the extent that their productivity is diminished. The technology makes it so much easier to get in touch with peers and colleagues but at the same time it requires one to discipline herself, in order to manage her time and attention, lest it might hurt instead of improve the overall experience. Answering the phone, chat or email right then and there does improve communication. However, a prompt response can become a distraction too. Some, set aside time to answer emails others advise their colleagues that they are in meetings, to fend off uncalled for interruptions.

One way to attract attention in the email arena is to ask for a read/return receipt to advise the recipient of the importance of the email. However, the read/return receipt mechanism has the potential to be abused or misused.

SUMMARY

In general, examples disclosed herein are directed to techniques for attention management. In one aspect, the techniques include building a communication history between two or more users, performing an analysis of the communication history for a pattern of communication between the two or more users; and generating an assessment based on the analysis. The communication history may include data from multiple different communication systems, including two or more of email, voice over IP, instant messaging, news feeds, web sites, social networking.

Building a communication history may include monitoring communication between the two or more users across the multiple different communications systems. Performing an analysis of the communication history may include applying a crowd source assessment criteria to the communication history. Performing an analysis of the communication history may include applying weights based on the age of the data. Performing an analysis of the communication history may include applying weights based on one or more of the following: read notification receipts, blind copies, followup time, selectivity, urgency, trends and user feedback. The techniques may further include providing an indication of the assessment to a user. Providing an indication of the assessment to a user may include providing an indication priority or urgency of communication.

In another example, a computer system for modeling business intelligence data includes one or more processors, one or more computer-readable memories, and one or more computer-readable, tangible storage devices. The system further include program instructions stored on at least one of the one or more storage devices for execution by at least one of the one or more processors via at least one of the one or more memories, to build a communication history between two or more users, perform an analysis of the communication history for a pattern of communication between the two or more users; and generate an assessment based on the analysis. The communication history may include data from multiple different communication systems.

In another example, a computer program product includes a computer-readable storage medium has program code embodied therewith. The program code is executable by a computing device to build a communication history between two or more users, perform an analysis of the communication history for a pattern of communication between the two or more users; and generate an assessment based on the analysis. The communication history may include data from multiple different communication systems.

DETAILED DESCRIPTION

Figure 1:
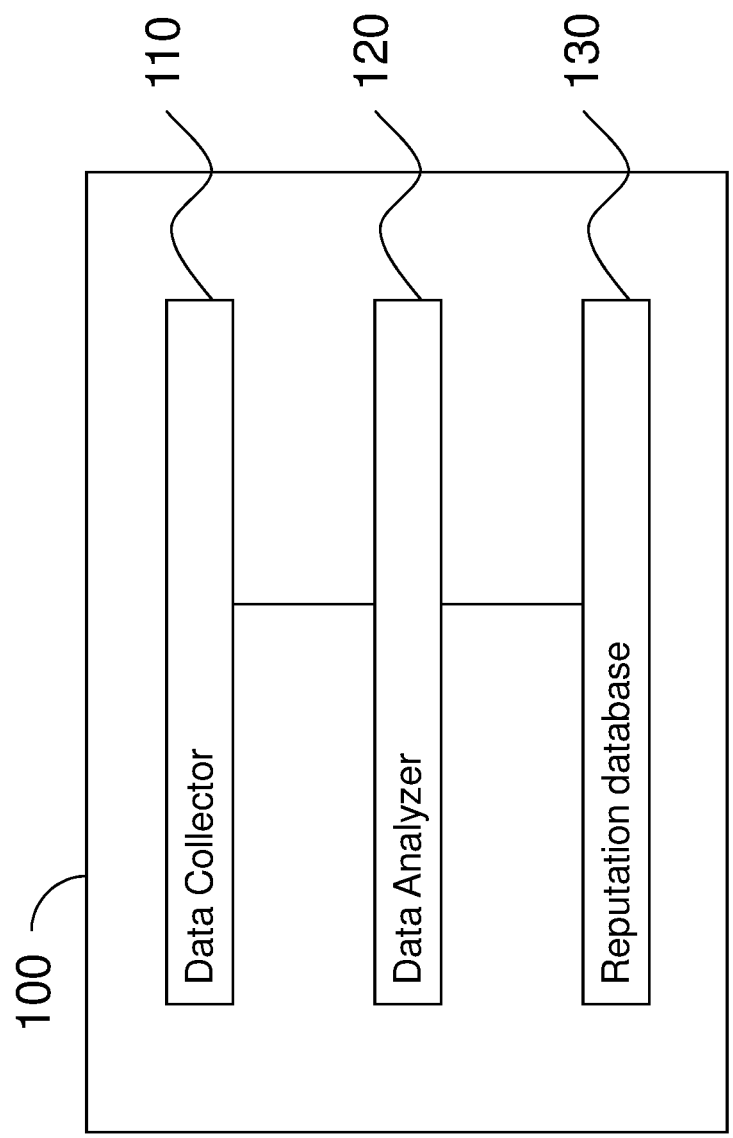
FIG. 1 is a block diagram illustrating a computing environment for attention management.

Various examples are disclosed herein for attention management. Virtually all modern communications methods are handled by computers in one form or another. This means it is possible using either integrated systems or big-data collection and analytics to monitor and track several forms of communications between users in order to discover patterns in user behavior that include social tools such as twitter and Facebook, as well as email.

The system would advise the recipient of a communication request of the sender's general reputation and the sentiment within the communications, and allow him to make an educated decision about her response. There are ample of examples where the public at large is readily collaborating in order to improve the overall experience of everyone in any given environment. Harnessing the power of the mass to learn of people communication traits will help improve the effectiveness of the communication and enable one to manage her attention better.

For instance, in one embodiment the system monitors the pattern of receiving an email read receipt soon followed by either another email associated with the same thread, an online chat request, a phone call or some other immediate form of communication is what our solution attempts to identify. The system then can solicit the recipients' opinion on whether the behavior was justified or not. That way a data base of associations is populated that can contain reputation, sentiment and topics, which can be consulted and can give the receiving user an idea of the party they deal with. Similarly, recipients can share their view of the necessity of a BCC they were part of.

As communication is between colleagues and peers, considering one's reputation can help in deciding who should get priority. Knowing that a given person does the utmost to minimize the use of the IMPORTANT or URGENT flags, entails that when she does use it, apparently it is justified. While another person is known for always "demanding" attention, and as such her requests should in general be queued behind more genuine urgent calls.

One technique frequently used by persistent email read receipt abusers is to ask for read receipts on every email sent, not just important emails. As soon as they receive the read receipt they tend to move immediately to a more direct means of communication. In essence, they treat read receipts as a notification mechanism that a recipient is active rather than its original design purpose.

Some email systems allow recipients to decide whether they want to have a read receipt sent back to the sender or not. In most cases sending read receipts helps avoid or delay receiving follow up "reminder" emails or calls. However in some cases allowing a receipt to be sent back might cause more harm than goodness for the recipient. What is not clear to the recipient is how they should respond. Being aware of the sender reputation is a way to assist the recipient in formulating a response or lack of response strategy.

As shown in FIG. 1, a system 100 includes a data collector 110 executable to collect large amounts of data over time. The data collector may be implemented using known techniques for big data collection. The data may be collected from multiple different communication systems, including but not limited to: email, instant messages, VoIP calls (e.g., Skype, Google Voice), news feeds, websites, social networking systems (e.g., Facebook, Twitter.)

The system 100 also includes a data analyzer 120 executable to analyze the data collected by data collector 110. The analysis includes identifying patterns in users' communication behavior, including patterns of email etiquette regarding the use of read/return receipts.

The system 100 may also include a reputation database 130 with entries that store the user communication behavior analysis data generated by the data analyzer 120.

Figure 2:
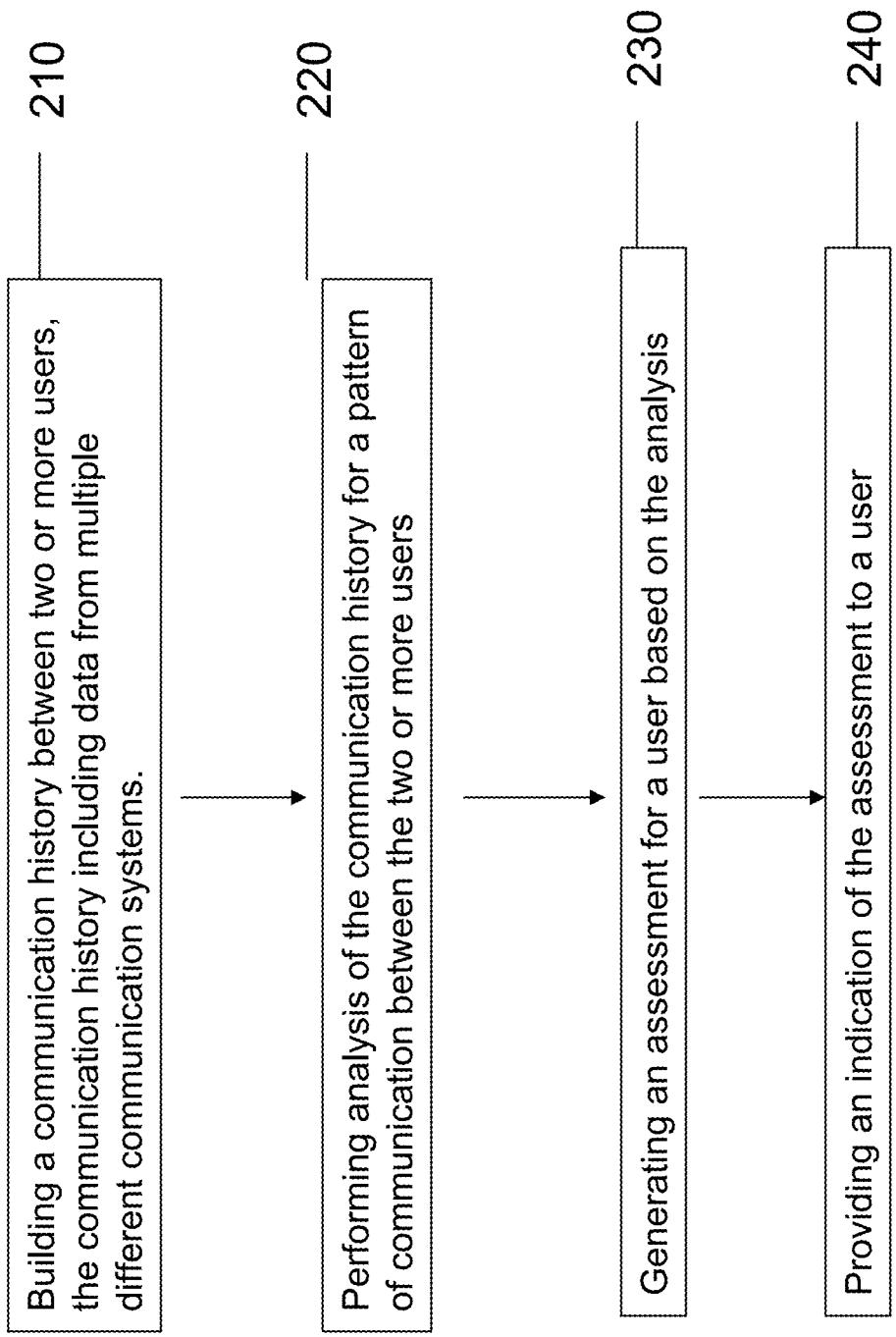
FIG. 2 is a flow diagram illustrating a method for attention management.

As shown in FIG. 2, the system 100 builds a communication history between two or more users, the communication history including data collected from multiple different communication systems (step 210.) The users may be senders and receivers in a social networking system.

Building the communication history may include monitoring communications between users. This can involve monitoring various sources and data inputs including, but not limited to:
  social communications, emails and any metadata about each communication (i.e. is a read receipt requested or not, who else the communication was sent to)
  on-line chat session logs
  phone call logs
  SMS or text message logs
  user contact information (i.e. what phone number(s) a user can be reached at or what online chat identities do they use)

Returning to the method of FIG. 2, the system 100 performs an analysis of the communication history for a pattern of communication between the two or more users (step 220). For example: Boaz sends me an email with a read receipt on it. He gets notified as soon as I read the email. He immediately calls my cube or sends me an instant message asking me about it before I have a chance to finish reading and reply. By analyzing all of the user interactions, their timings and attributes (e.g. the read receipt) across all of the communications systems available the system 100 detects a pattern in how Boaz interacts with me.

The system 100 generates an assessment based on the analysis (step 230). In one embodiment, the system 100 applies a crowd source assessment criteria. The system 100 may apply weights based on the age of the data such that recent findings will have weight more than older findings. This allows the system 100 to adapt to any changes in user behavior over time and to adjust its recommendations according to the demonstrated user tendencies. The system 100 may also apply weights to the crowd source assessment criteria. The weights may be selected from a group including but not limited to:

read notification receipts
blind copies (BCC)
followup time
selectivity,
urgency,
trends (e.g., recent versus previous history)
user feedback The assessment generated by the system 100 may be pattern-based but may also solicit information from users. If users' input is used then it uses known techniques (like requiring multiple confirmations before a bad trait is considered genuine) to filter out vindictive colleagues who might try to poison the reputation of another user. The assessment may be based on observed behavior logged by the different systems being monitored.

Once the assessment has been generated by the system 100, the system provides an indication of the assessment to a user (step 240). The user may be a communication recipient and the indication may indication a priority of handling the communication.

For example, in the prior example from paragraph 27, the system 100 may determine that Boaz does this all the time so his "high priority" emails should be ranked/displayed lower in my Inbox than others. Or it may decide to warn me about his anticipated behavior when I attempt to open a new email from him. It could suggest I defer that until other activities are completed. If Boaz changes his behavior and stops using instant messaging immediately after receiving a read receipt then the system would detect this and improve its assessment of him. That in turn would be reflected in how his emails get ranked/displayed in my Inbox.

The assessment can be used by both the communication initiators and their recipients. The recipient can use the recommendation to decide on the proper attention he should pay. The initiator can use the recommendation as a form of education on how they are perceived by those they interact with and potentially improve their perceived behavior thus improving their interactions with others.

Figure 3:
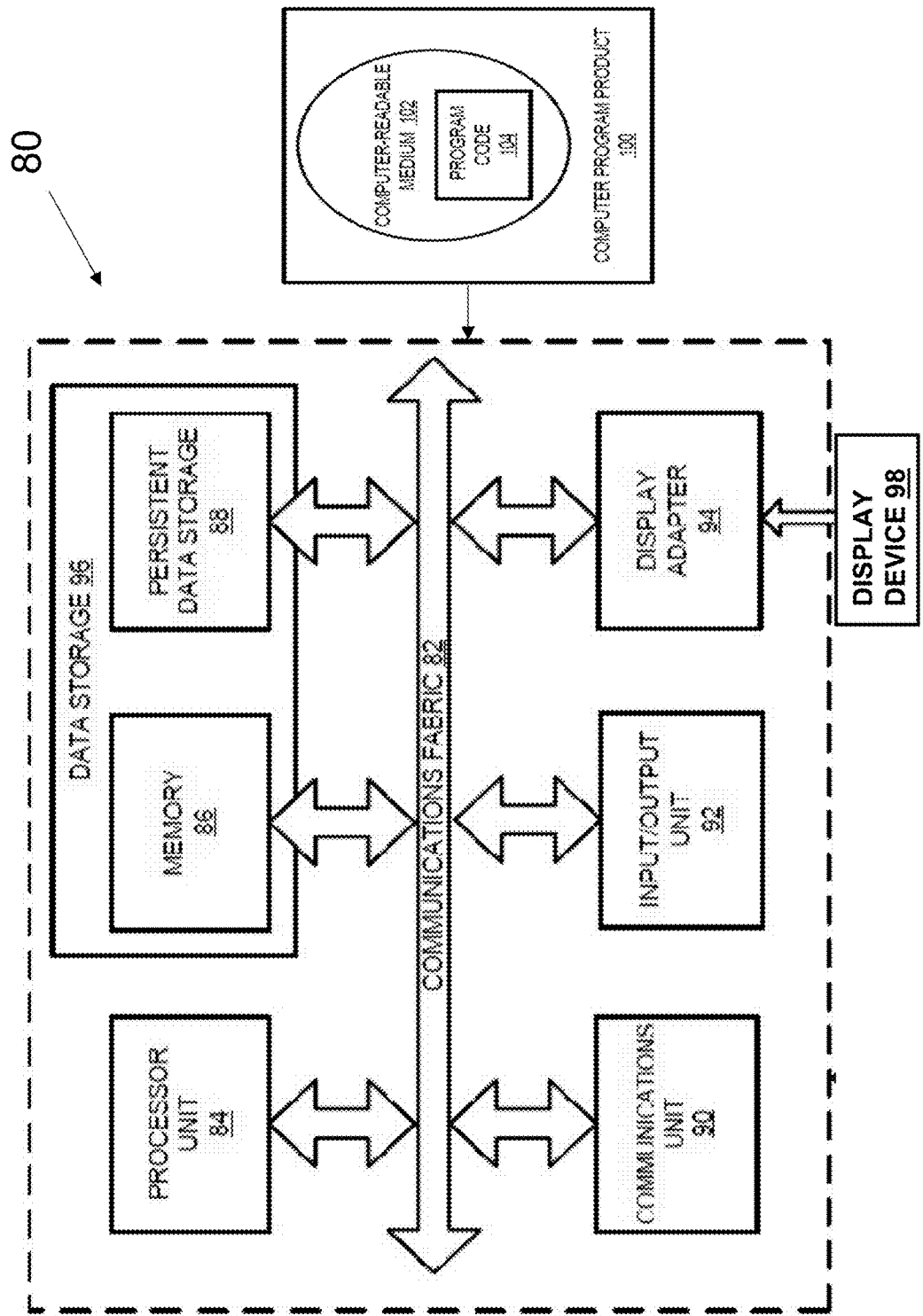
FIG. 3 is a block diagram of a computing device for attention management.

FIG. 3 is a block diagram of a computing device 80 that may be used to execute an attention management program, according to an illustrative example. Computing device 80 may be a server such as a web server or application server. Computing device 80 may also be a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 3, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Some examples may use such a non-transitory medium. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a semantic model constructor 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples.

Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of IBM CONFIDENTIAL D-2 the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for attention management, the method comprising:
    building a communication history between a first user and a second user that occurs over multiple different communication systems, the communication history including metadata corresponding to messages transferred by the multiple different communication systems between the first user and the second user;
    performing an analysis of the metadata by applying weights to a crowd source assessment criteria to the communication history, wherein the weights are selected from the group consisting of read notification receipts, blind copies, followup time, selectivity, urgency, trends, and user feedback; and
    generating an assessment based on the analysis of the metadata, wherein the assessment comprises a priority of responding to a message received by the first user from the second user.

2. The method of claim 1, wherein the multiple different communications systems include two or more of email, voice over Internet Protocol, instant messaging, news feeds, web sites, and social networking.

3. The method of claim 1, wherein the building the communication history includes monitoring communication between the first user and the second user across the multiple different communications systems.

4. The method of claim 1, wherein the performing the analysis of the metadata includes applying the weights based on an age of the metadata.

5. The method of claim 1, further comprising providing an indication of the assessment to a user.

6. The method of claim 1, wherein the performing the analysis of the metadata includes performing an analysis of the communication history to determine a pattern of communication between the first user and the second user.

7. A computer system for attention management, the computer system comprising:
    one or more processors, one or more computer-readable memories, and one or more computer-readable, tangible storage devices;
    program instructions, stored on at least one of the one or more storage devices for execution by at least one of the one or more processors via at least one of the one or more memories, to build a communication history between a first user and a second user that occurs over multiple different communication systems, the communication history including metadata corresponding to messages transferred by the multiple different communication systems between the first user and the second user;
    program instructions, stored on at least one of the one or more storage devices for execution by at least one of the one or more processors via at least one of the one or more memories, to perform an analysis of the metadata by applying weights to a crowd source assessment criteria to the communication history, wherein the weights are selected from the group consisting of read notification receipts, blind copies, followup time, selectivity, urgency, trends, and user feedback; and
    program instructions, stored on at least one of the one or more storage devices for execution by at least one of the one or more processors via at least one of the one or more memories, to generate an assessment based on the analysis of the metadata, wherein the assessment comprises a priority of responding to a message received by the first user from the second user.

8. The system of claim 7, wherein the multiple different communications systems include two or more of email, voice over Internet Protocol, instant messaging, news feeds, web sites, and social networking.

9. The system of claim 7, wherein the program instructions to build the communication history includes program instructions to monitor communication between the first user and the second user across the multiple different communications systems.

10. The system of claim 7, wherein the program instructions to perform the analysis of the metadata includes program instructions to apply the weights based on an age of the metadata.

11. The system of claim 7, further comprising: program instructions to provide an indication of the assessment to a user.

12. The computer system of claim 7, wherein the program instructions to perform the analysis of the metadata include program instructions to perform an analysis of the communication history to determine a pattern of communication between the first user and the second user.

13. A computer program product for attention management, the computer program product comprising a non-transitory computer-readable storage medium having program code embodied therewith, the program code executable by a computing device to:
build a communication history between a first user and a second user that occurs over multiple different communication systems, the communication history including metadata corresponding to messages transferred by the multiple different communication systems between the first user and the second user;
perform an analysis of the metadata by applying weights to a crowd source assessment criteria to the communication history, wherein the weights are selected from the group consisting of read notification receipts, blind copies, followup time, selectivity, urgency, trends, and user feedback; and
generate an assessment based on the analysis of the metadata, wherein the assessment comprises a priority of responding to a message received by the first user from the second user.

14. The program product of claim 13, wherein the multiple different communications systems include two or more of email, voice over Internet Protocol, instant messaging, news feeds, web sites, and social networking.

15. The program product of claim 13, wherein the code executable to build the communication history includes code executable to monitor communication between the first user and the second user across the multiple different communications systems.

16. The program product of claim 13, wherein the code executable to perform the analysis of the metadata includes code executable to apply the weights based on an age of the metadata.

17. The program product of claim 13, further comprising: code executable to provide an indication of the assessment to a user.

18. The computer program product of claim 13, wherein the code executable to perform the analysis of the metadata includes code executable to perform an analysis of the communication history to determine a pattern of communication between the first user and the second user.

* * * * *